United States Patent [19]
Jensen

[11] Patent Number: 6,028,710
[45] Date of Patent: Feb. 22, 2000

[54] METHOD AND APPARATUS FOR HEAD-MOUNTED OPTICAL MAGNIFICATION

[76] Inventor: Eric Alfred Jensen, 19020 Brook La., Saratoga, Calif. 95070

[21] Appl. No.: 09/076,299

[22] Filed: May 11, 1998

[51] Int. Cl.[7] ............................ G02B 27/14; G02B 23/00
[52] U.S. Cl. ........................... 359/630; 359/632; 359/407
[58] Field of Search ................... 359/630, 631, 359/632, 633, 819, 407

[56] References Cited

U.S. PATENT DOCUMENTS

| | | | |
|---|---|---|---|
| D. 154,492 | 7/1949 | Katz | D16/133 |
| D. 156,733 | 1/1950 | Hofer et al. | D16/133 |
| D. 296,337 | 6/1988 | Caplan | D16/133 |
| D. 305,902 | 2/1990 | Wakayama et al. | D16/133 |
| D. 333,828 | 3/1993 | Baldassarre | D16/133 |
| 395,872 | 1/1889 | Briggs | 359/411 |
| 396,657 | 1/1889 | Holle | 359/408 |
| 574,124 | 12/1896 | Wainwright | 359/408 |
| 1,851,579 | 3/1932 | Hixon | 359/411 |
| 2,024,018 | 12/1935 | Wollensak | 359/411 |
| 2,280,354 | 4/1942 | Rezos | 359/408 |
| 2,986,969 | 6/1961 | Muncheryan | 359/478 |
| 3,029,686 | 4/1962 | Bernzott | 226/91 |
| 4,196,966 | 4/1980 | Malis | 350/145 |
| 4,274,128 | 6/1981 | Malis | 362/105 |
| 5,526,178 | 6/1996 | Goldstein et al. | 359/407 |

*Primary Examiner*—Georgia Epps
*Assistant Examiner*—Suzanne Letendre
*Attorney, Agent, or Firm*—James E. Eakin

[57] ABSTRACT

An optical device that can be either permanently or temporarily affixed to a headgear, such as a cap or a visor, is disclosed. The optical device comprises right and left barrels or lens holders, each of which is non-adjustable or if adjustable is joined to a gear assembly. The barrels may be joined separately to the gear assembly in some embodiments. The gear assembly includes a knob for moving the lens for focus adjustments. By using the optical device of the present invention, the user does not have to continuously hold the optical device in close proximity to the eyes to view distant objects or require constant focusing. The optical device may be used for indoor or outdoor events.

34 Claims, 16 Drawing Sheets

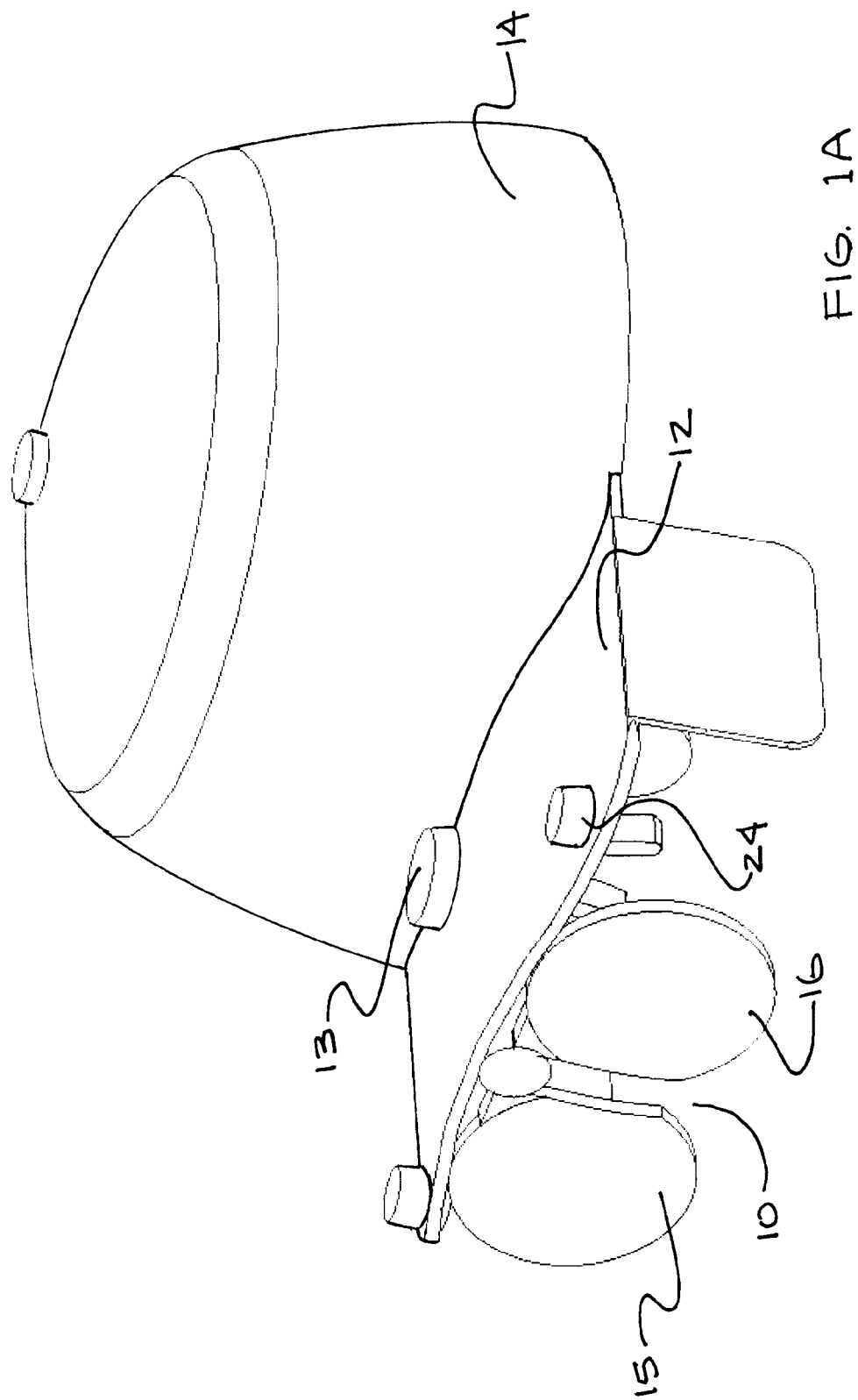

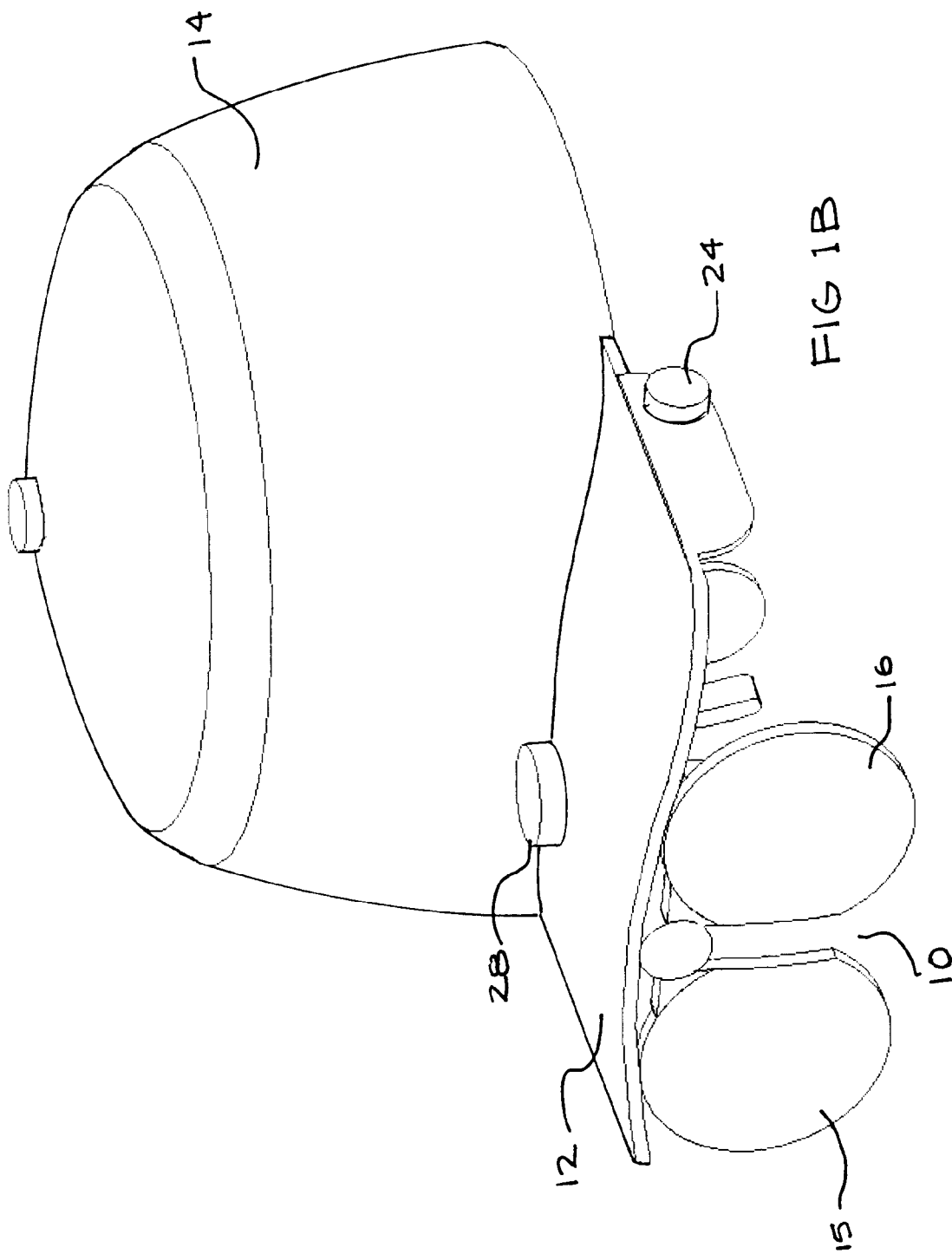

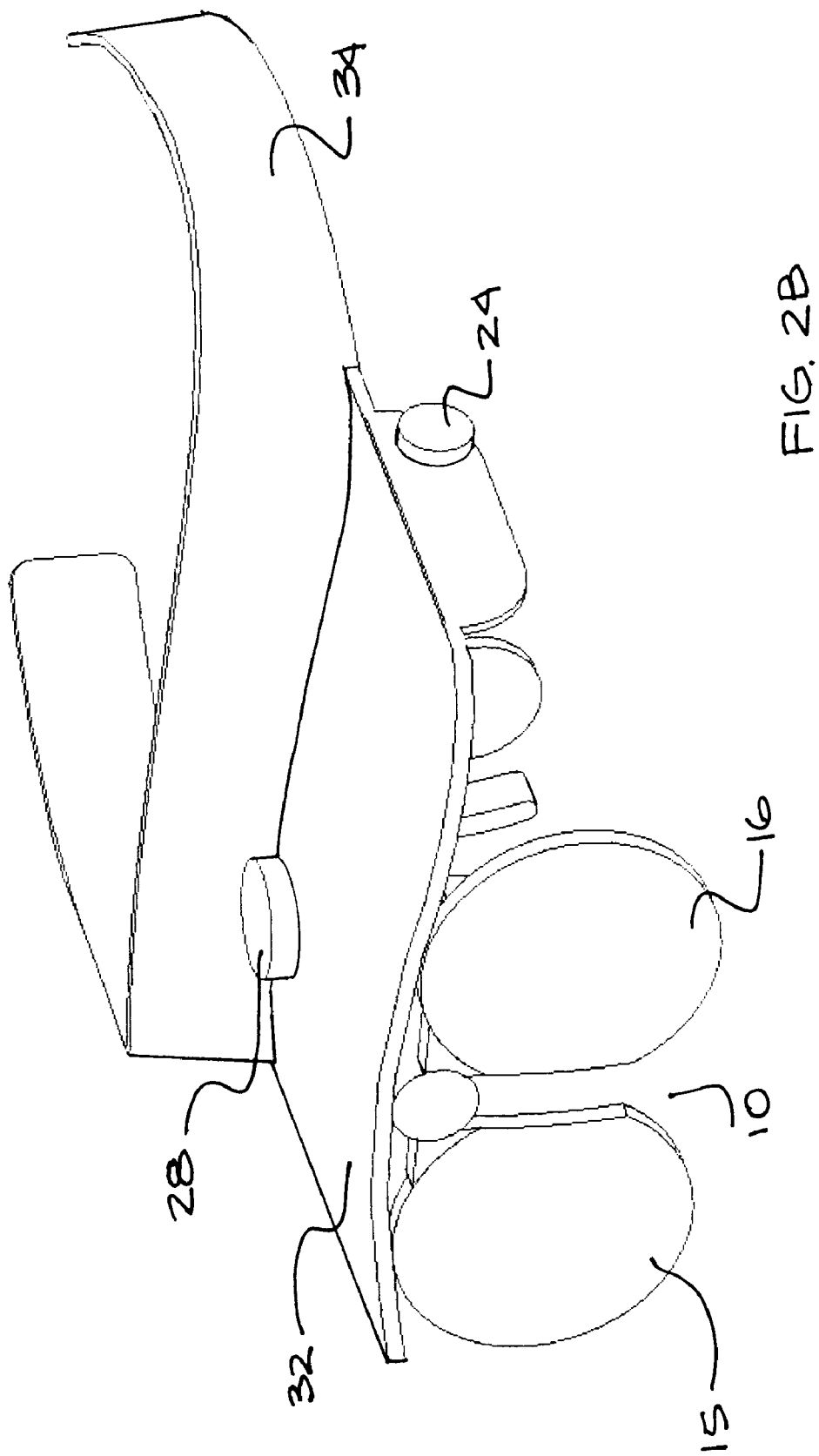

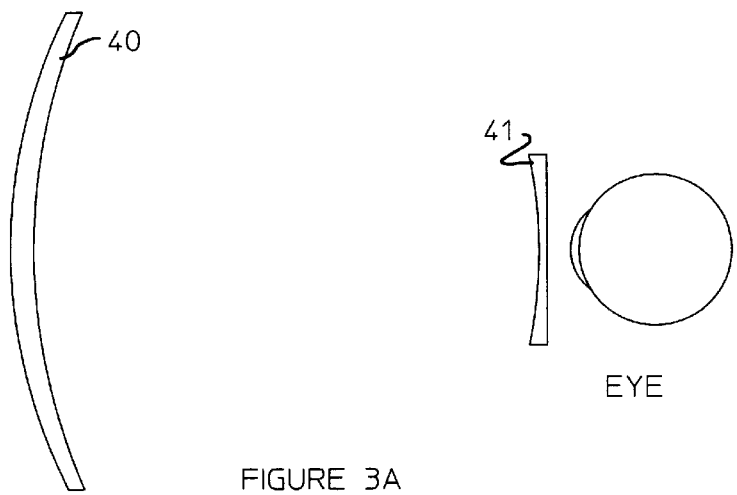
FIGURE 3A
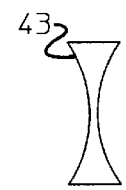
FIGURE 3B
FIGURE 3C

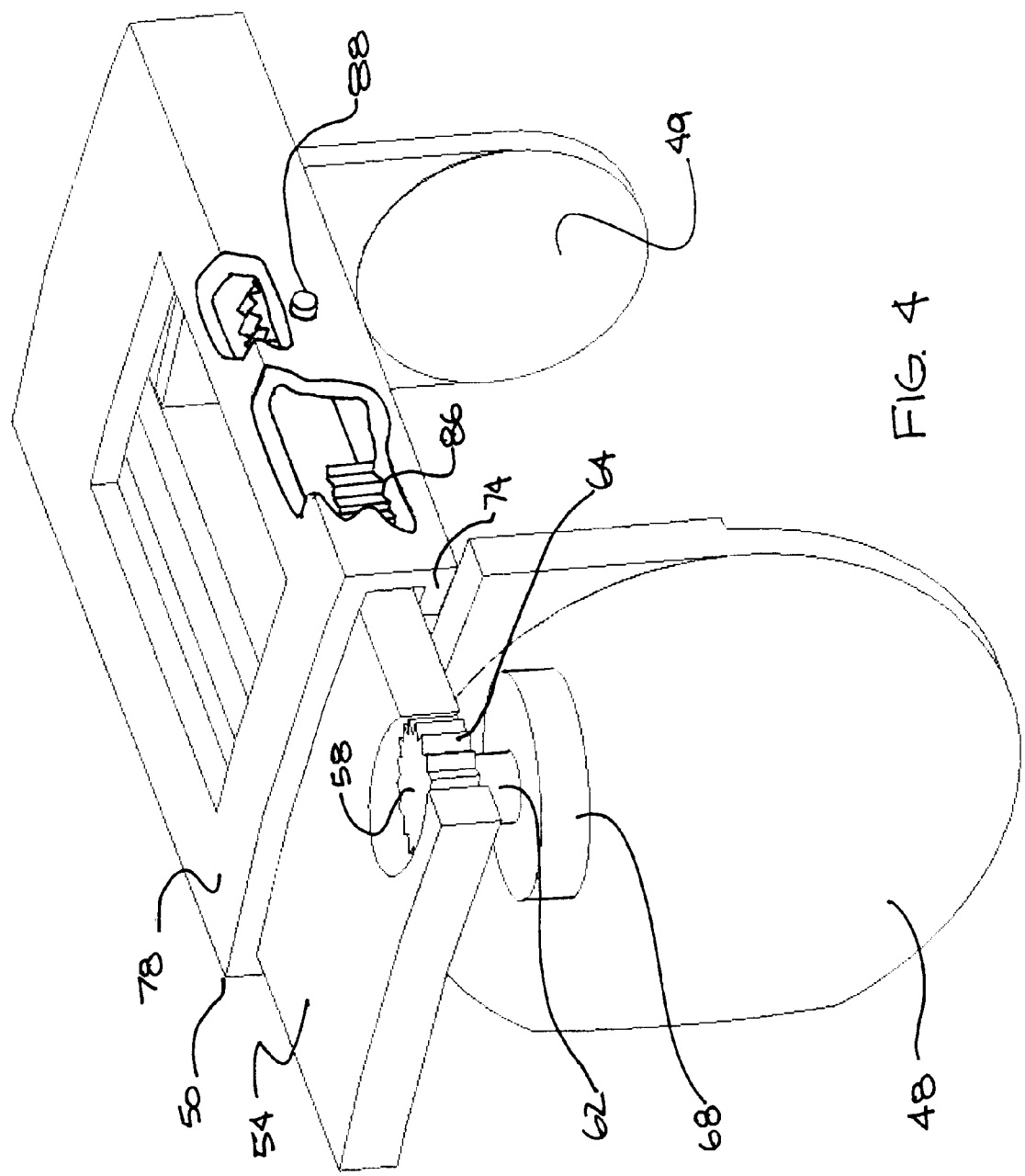

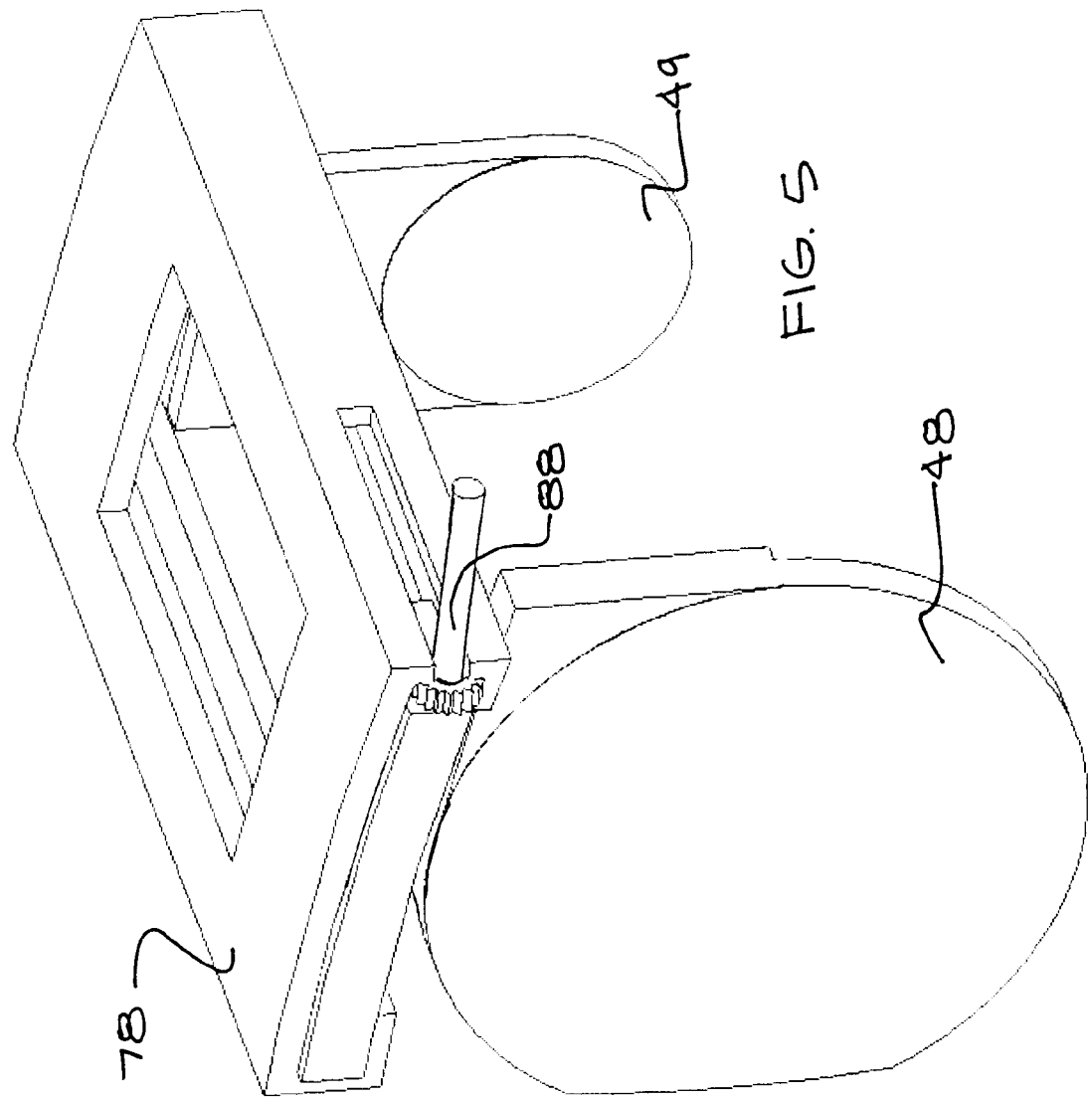

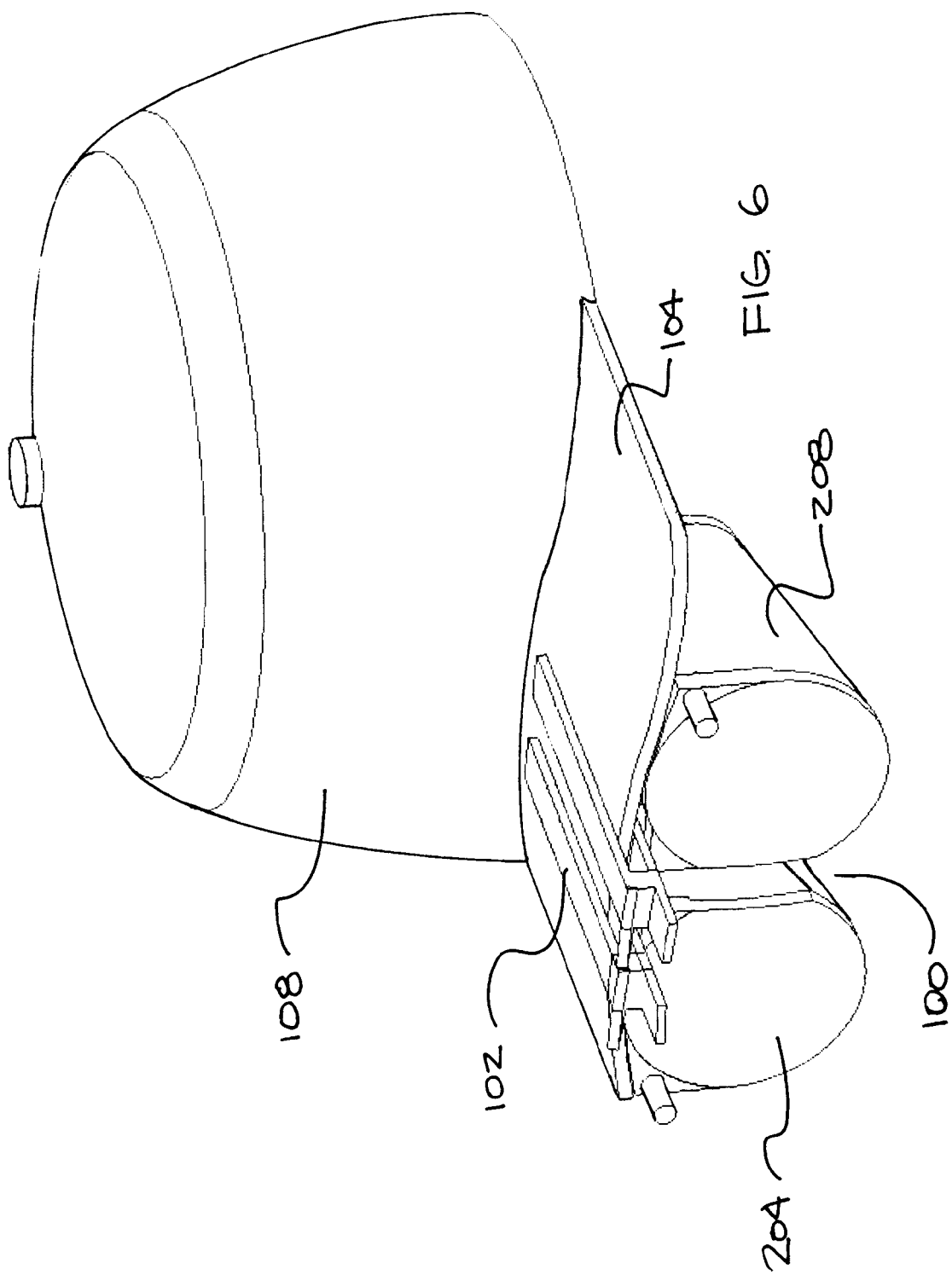

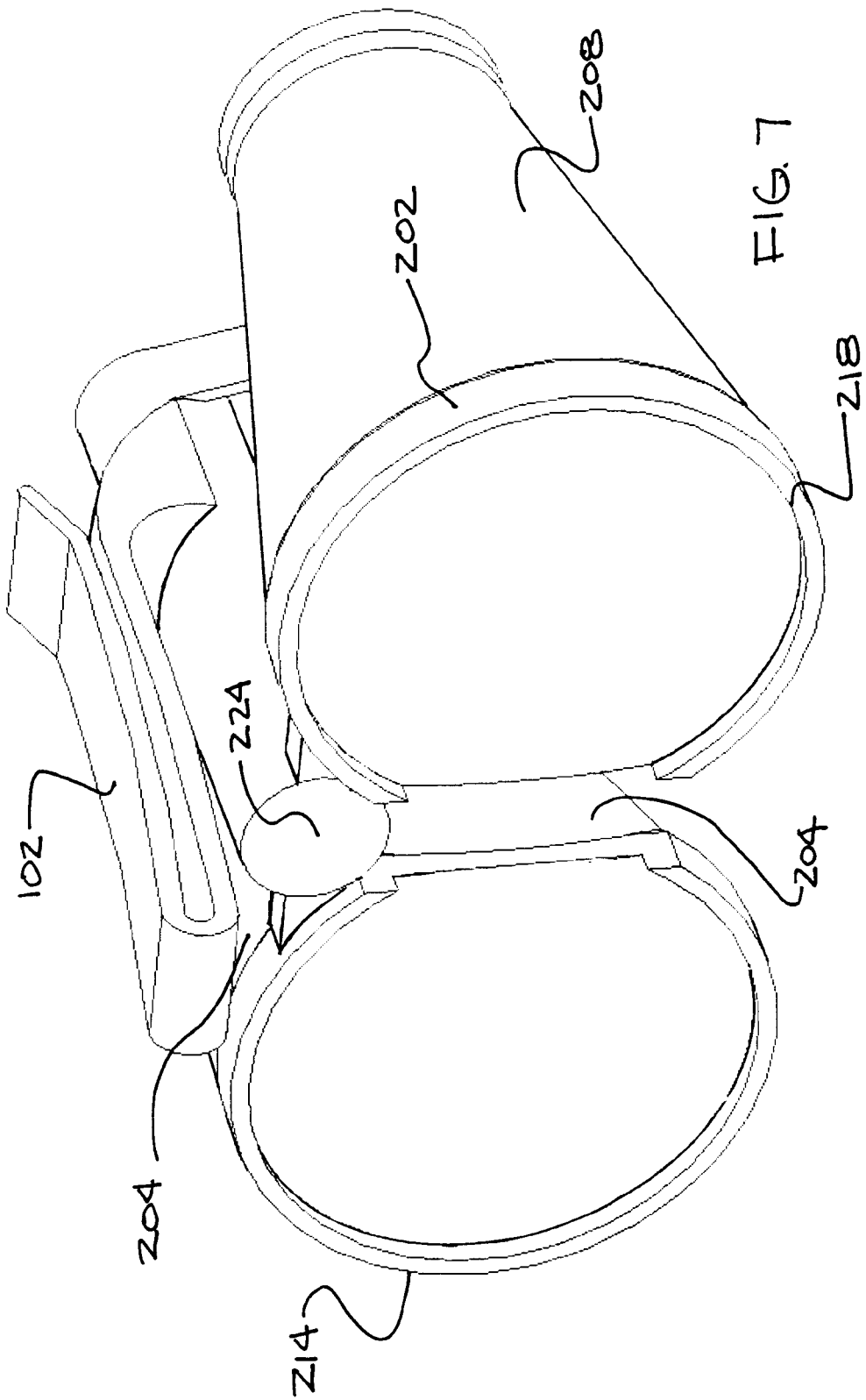

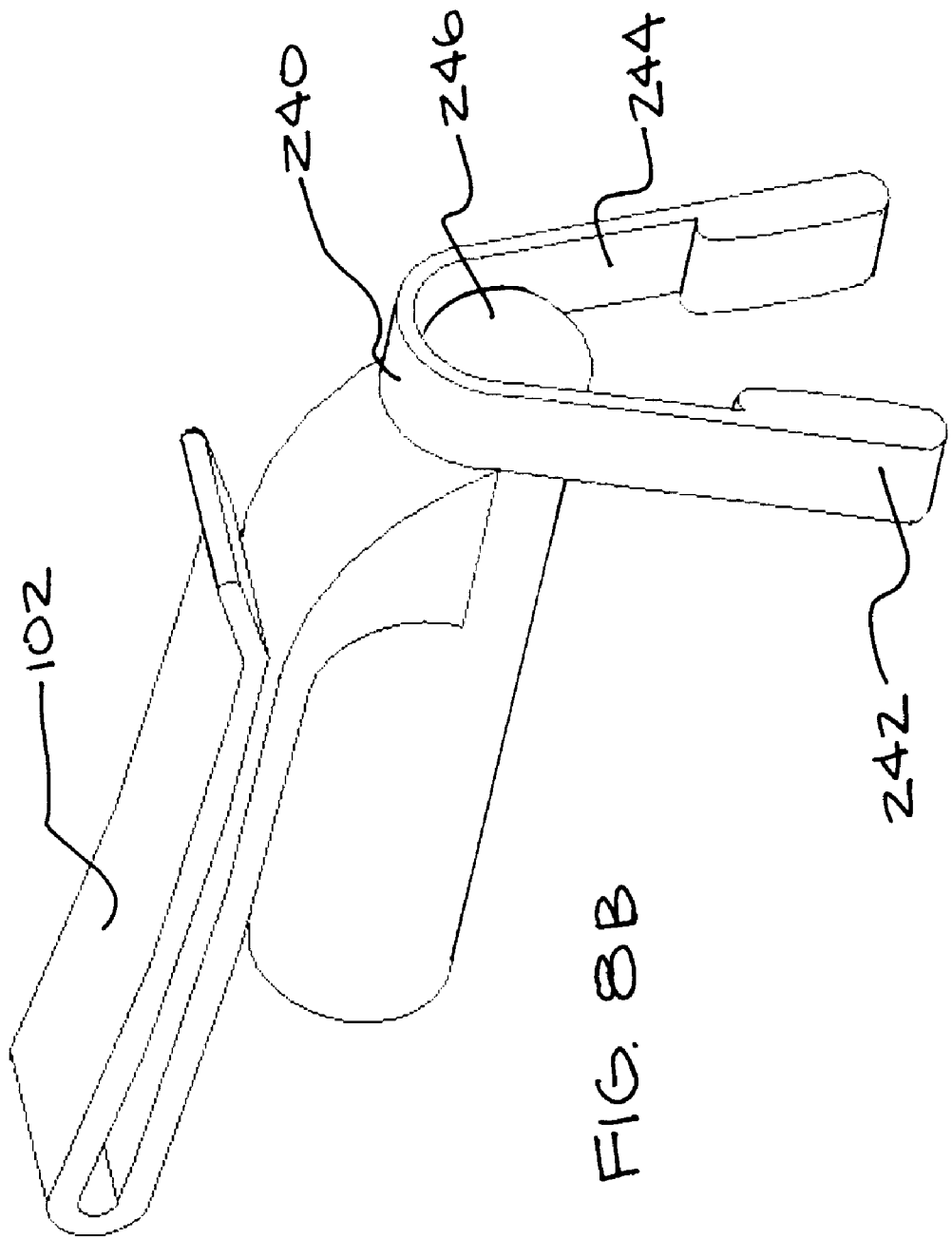

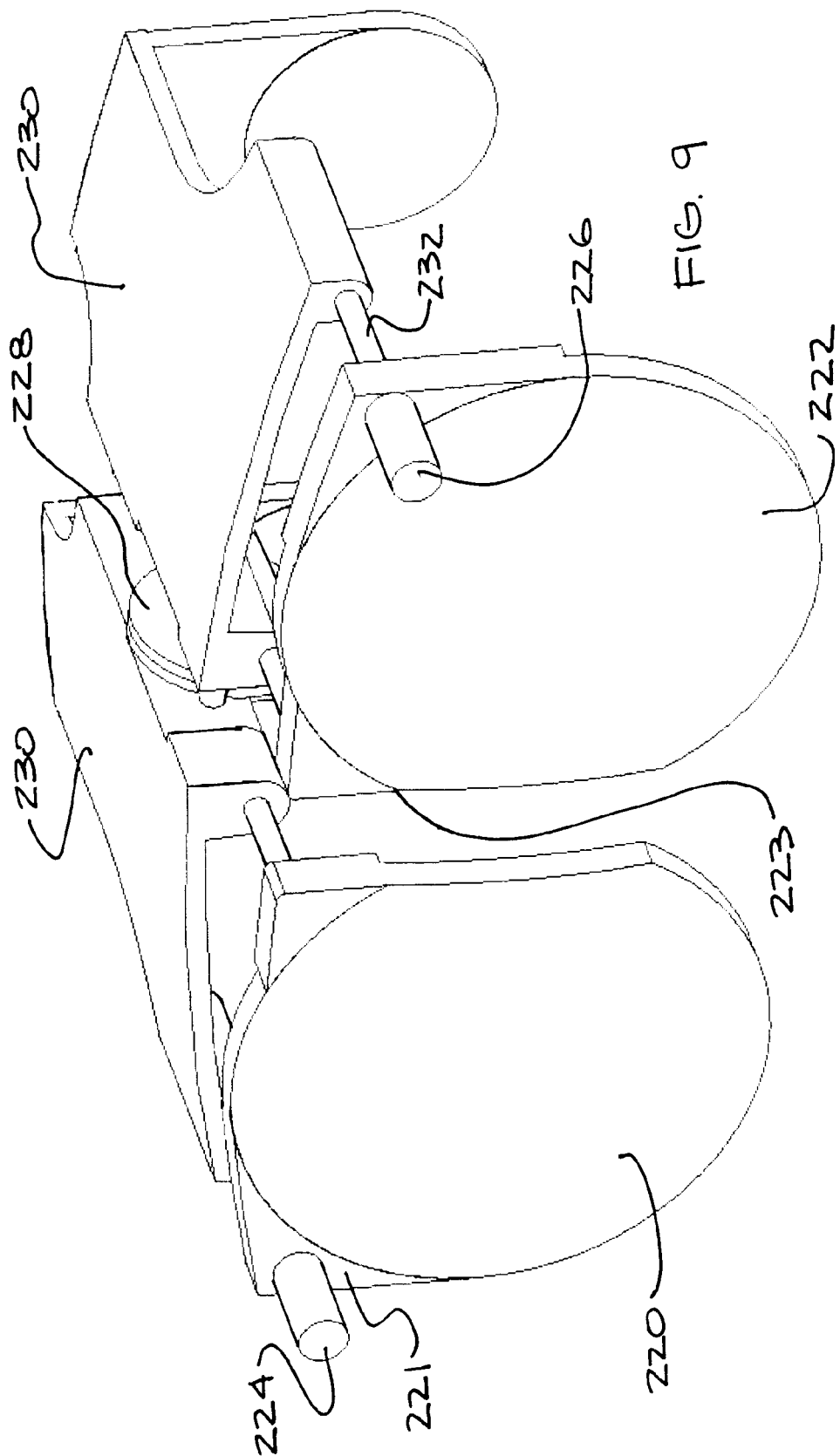

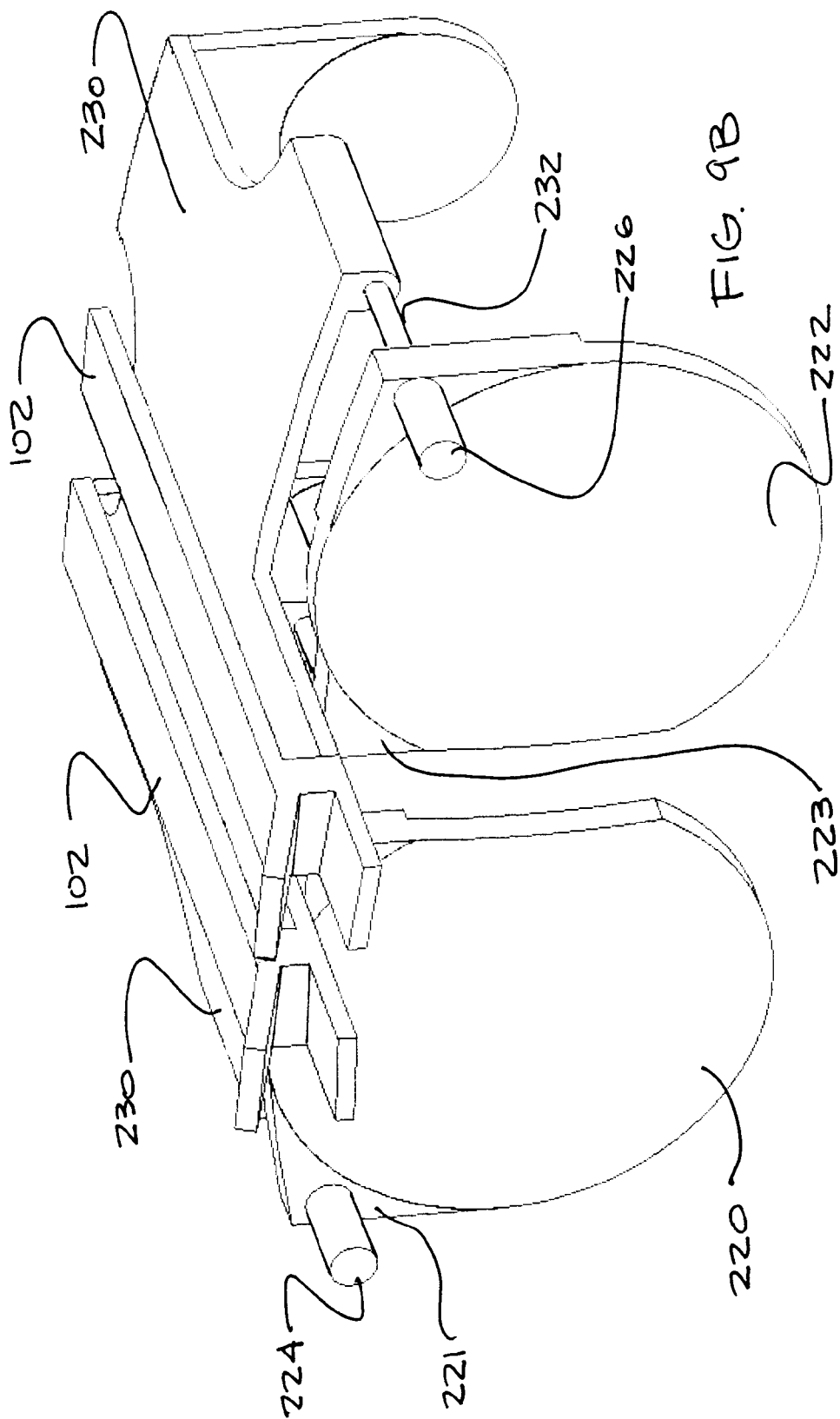

METHOD AND APPARATUS FOR HEAD-MOUNTED OPTICAL MAGNIFICATION

TECHNICAL FIELD OF THE INVENTION

This invention relates generally to a method and apparatus for facilitating optical magnification, and more specifically, to a method and apparatus for facilitating optical magnification with an optical device having magnifying capabilities affixed to a form of headgear for viewing indoor and/or outdoor activities such as sporting or other arena-based events and for enhancing dusk/night vision.

BACKGROUND OF THE INVENTION

Optical magnification has become particularly advantageous in a number of key types of indoor and/or outdoor activities. For example, spectators at sporting events or concerts generally use binoculars to better observe distant activity, or simply to compensate for poor seating.

In general, binoculars magnify the image of a distant object for a user to make the object appear closer than its actual distance. In order to comfortably view the object with particularity, the spectator may need to adjust the focus of the binoculars, adjust the distance between the right and left eyepiece and, at times, adjust the level of magnification. When adjusting the magnification, a spectator generally needs to adjust the lens system of each of the binocular's two barrels.

Conventional optical magnification devices, such as binoculars subject the spectator's view of indoor and/or outdoor activities to a number of limitations. For example, conventional binoculars must be hand-held and positioned in close proximity to the eyes of a spectator. Further, conventional binoculars require the spectator to constantly adjust the focus of each binocular barrel. Still further, a spectator's use of conventional binoculars when viewing a sporting or other type of event typically causes such user to acquire a splitting headache. The spectator may acquire a headache due, in part, to the "shake" or jitter that occurs when viewing indoor and/or outdoor activity because conventional binoculars are hand-held. A headache may also be attributed to the over magnification typically provided by conventional binoculars, and to eye lock that occurs because conventional binoculars restrict a user's eye movement.

As a result, there has been a longfelt need for an optical device that need not be hand-held, does not require constant focus adjustment, follows the user's head movements and can be used for extended periods without causing eyestrain, headache or neckstrain.

SUMMARY OF THE INVENTION

The present invention substantially improves on prior art optical magnification methods and apparatus used to magnify a user's view of images. The optical device of the present invention allows a user to view an enlarged version of a distant object without having the headaches and other discomfort that result from the excessive magnification of conventional optical devices.

The apparatus and method of the present invention provides a means for adapting the optical device to mount to the headgear of a user so that the optical device follows the user's head movements.

It will be appreciated from the foregoing that a significant aspect of the present invention is the ability for a user to receive a view of objects at an appropriate magnification level with an optical device that follows the user's head movements. Viewing with the optical device of the present invention does not result in the user getting a headache. Headache free use is due in part to the mounting of the optical component to headgear so that the user doe not receive the unwanted movement that generally occurs when viewing objects with conventional hand-held optical devices such as binoculars. Other reasons for head-ache free use include, allowing for natural eye movement since the optical device of the present invention includes wide filed of view and follows the user's headmovement, and providing for a lower power of magnification, unlike the higher power magnification of conventional magnifying optical devices.

Further, because the optical component of the present invention it mounted to either a user's head or to headgear, a users hands are available to perform other tasks. For example, a spectator using the optical device at a sporting event may obtain a magnified view of the event while demonstrating a response to the event. Such response may include, for instance, hand clapping, boos and the familiar fan wave.

Still further, the lower magnification and wide field of view of the present invention allows the user to continue to use the present invention without a focus adjustment and without a need to remove the optical device when viewing objects that are close to and distant from the user. For example, a spectator using the present invention to view a sporting event may reach for a close object such as food or a beverage without the need to remove and adjust such device. In another example, a user of the optical device of the present invention while driving a vehicle with the low power combination of lenses may view both the road and instruments within the vehicle, such as a speedometer, without a need to adjust the focus of the device and without a need to remove the device.

Still further, the natural light gathering of the lenses of the optical device of the present invention brightens the user's view of an object. Hence, the optical device facilitates a user's view while driving at night. Application of this device is not limited to cars and may be used for all types of transportation, such as cars, bicycles, motorcycles, etc. Individuals inflicted with night-time vision disabilities can use the optical device simply to walk in areas with minimal light and at night.

Still further, because the optical component includes an adaptable clamping component, it may be worn with many different types of headgear. Moreover, the optical device may simply mount to ones head. Such a broad application facilitates ease of use of the optical device.

The invention may be better appreciated from the following Figures, taken together with the accompanying Detailed Description of the Invention. Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1A shows a top view of the optical component affixed to a cap in accordance with the present invention.

FIG. 1B shows a perspective view of the optical component of FIG. 1A.

FIG. 2B shows a perspective view of the optical component of FIG. 2A.

FIG. 3A shows an exemplary but not limiting arrangement of a lens set for each right and left barrel of the optical component.

FIG. 3B shows another exemplary but not limiting arrangement of a lens set for each right and left barrel of the optical component.

FIG. 3C shows another exemplary but not limiting arrangement of a lens set for each right and left barrel of the optical component.

FIG. 4 shows an exploded perspective view of a gear assembly of the optical component used to adjust the distance between the eyes in accordance with the present invention.

FIG. 5 shows a perspective view of the gear assembly of the optical component, wherein the support portion is inserted into the frame.

FIG. 6 shows a perspective view of the optical component of the present invention clipped onto the brim of a cap.

FIG. 7 shows a perspective view of the optical device shown in FIG. 6.

FIG. 8B shows a perspective view of the adjustable nosepiece of FIG. 8A.

DESCRIPTION OF THE PREFERRED EMBODIMENTS

Figure 2A:
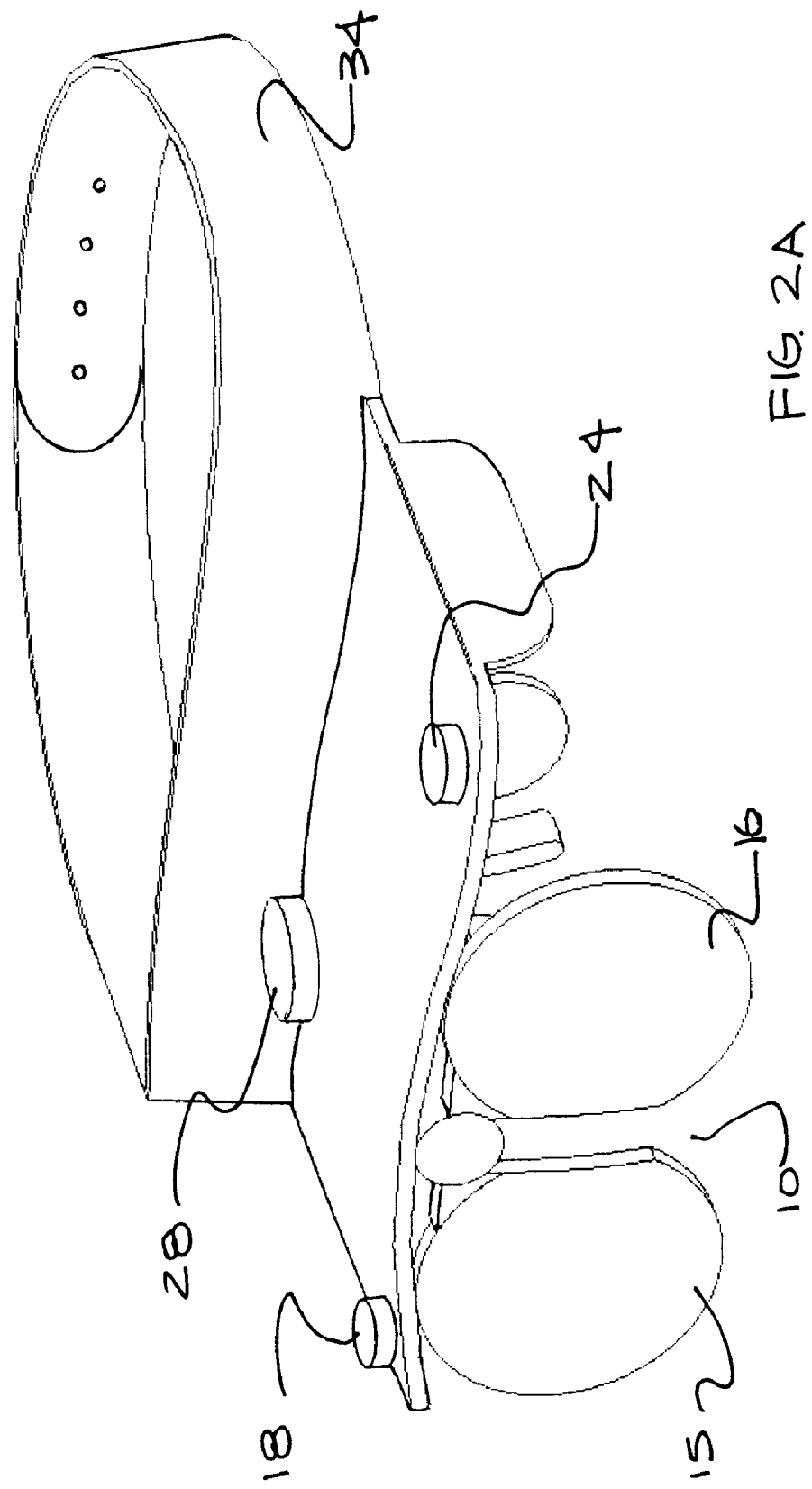
FIG. 2A shows a top view of the optical component affixed to a visor in accordance with the present invention.

The following description is of the best presently contemplated mode of carrying out the invention. The description is made for the purpose of illustrating the general principles of the invention and is not to be taken in a limiting sense.

Referring first to FIG. 1A, a top view of an exemplary but not limiting embodiment of an optical component affixed to a cap may be generally appreciated. As shown, in FIG. 1A, the optical component 10 is affixed to brim 12 of cap 14. Although a cap is shown, other embodiments of the present invention may include other types of headgear.

Optical component 10 includes a right viewing component, such as a right barrel 15 and a left viewing component, such as a left barrel 16. A right knob 18 and a left knob 24 mounted on the top of brim 12 adjust the focus of the right barrel 15 and left barrel 16 respectively. Right knob 18 and left knob 24 are individually connected to a gear assembly (not shown and described with more particularity hereinbelow). Center knob 28 mounted on the top of brim 12 when turned inwardly and outwardly moves the right and left barrels, thereby adjusting the space between each barrel. Adjusting space with the center knob 28 adapts the distance between the inwardly facing sides of the right and left barrels to the space between a user's eyes, commonly known as the intraocular distance.

Referring next to FIG. 1B, a perspective view of another exemplary but not limiting embodiment of an optical component may be generally appreciated. As shown, right knob 18 and left knob 24 are disposed respectively on the right and left sides of brim 12 of cap 14.

Referring next to FIG. 2A, a top view of another exemplary but not limiting embodiment of an optical component in accordance with the present invention may be generally appreciated. More particularly, the optical component is affixed to brim 32 of visor 34. As discussed hereinabove with regard to FIG. 1A, the optical component 10 includes a right viewing component, such as a right barrel 15 and a left viewing component, such as a left barrel 16. A right knob 18 and a left knob 24 mounted on the top of brim 32 adjust the focus of the right barrel 15 and left barrel 16 respectively. Right knob 18 and left knob 24 are individually connected to a gear assembly (not shown and described with more particularity hereinbelow). Center knob 28 mounted on the top of brim 12 move the right and left barrels inwardly and outwardly, thereby adjusting the space between each barrel.

Referring next to FIG. 2B, a perspective view of another exemplary but not limiting embodiment of the optical device of FIG. 1A may be generally appreciated. As discussed hereinabove with regard to FIG. 1B, knobs 18 and 24 used for focus adjustment are disposed on the right and left sides of the visor 34 respectively.

In a preferred embodiment, the primary design optics of the optical component include a two lens system. FIGS. 3A, 3B, and 3C show exemplary but not limiting embodiments of such lens systems.

More particularly, FIG. 3A shows a side view of an exemplary but not limiting embodiment of a two lens system included within each right and left barrel (15&16) (not shown). As shown, a positive meniscus shaped objective lens 40 and a plano-concave eye lens 41 are fixedly mounted within each barrel.

FIG. 3B shows a side view of an exemplary but not limiting embodiment of a two lens system that is included within each right and left barrel (15&16) (not shown). As shown, a bi-convex shaped (positive achroma) objective lens 42 and a negative meniscus shaped eye lens 43 are fixedly mounted inside each barrel.

FIG. 3C shows a side view of another exemplary but not limiting embodiment of a two lens system that are included with the right and left barrel (15&16) (not shown). As shown, a plano-convex shaped objective lens 44 and a negative acromatic shaped eye lens 45 are fixedly mounted within each barrel.

For each two lens set shown in FIGS. 3A, 3B and 3C, one skilled in the art will understand that for each lens there is a preferred dimension and focal length. Shown below in Table One are preferred dimensions and corresponding focal lengths for each lens set. Also shown for each lens set is a sum of the focal lengths of the objective and eye lens, and the magnification corresponding to each sum.

TABLE ONE

| OBJECTIVE LENS | | EYE LENS | | | |
|---|---|---|---|---|---|
| DIAMETER | FOCAL LENGTH | DIAMETER | FOCAL LENGTH | SUM | MAGNI-FICATION |
| 57 mm. | 110 mm. | 40 mm. | −72 mm. | 38 | 2.0× |
| 64 mm. | 154 mm. | 52 mm. | −112 mm. | 42 | 2.5× |
| 45 mm. | 78 mm. | 31 mm. | −33 mm. | 45 | 2.7× |
| 64 mm. | 274 mm. | 27 mm. | −170 mm. | 63 | 3.4× |
| 64 mm. | 274 mm. | 27 mm. | −211 mm. | 80 | 3.7× |
| 64 mm. | 271 mm. | 27 mm. | −170 mm. | 104 | 4.0× |
| 50 mm. | 500 mm. | 37 mm. | −420 mm. | 100 | 4.0× |
| NIGHT VISION EXAMPLE | | | | | |
| 64 mm. | 274 mm. | 50 mm. | −245 mm. | 29 | 1.2× |

One of ordinary skill in the art will recognize that the lens set shown in Table One each include an unconventional combination of an objective lens having a large diameter and an eye lens having a long negative focal length. Such combination allows a user to have a wide field of view and provides a magnification level particular helpful in viewing spectator sports.

The optical device of the present invention that includes a lens set with a low power magnification of (1.2× to 2×) facilitates night/dusk driving. Such lenses brighten and enhance the clarity of the user's view. As shown in Table One, an exemplary but not limiting embodiment of the lens set is an objective lens having a diameter of 64 mm with a focal length of 274 mm., and an eye lens having a diameter of 27 mm. and a focal length of −211 mm.

Although each lens set listed in Table One is preferred, lenses of other diameters and focal lengths with different levels of magnification may be used in the present invention. Further, if viewing conditions so require higher magnification strengths, lens sets of three or more lenses may be included within each barrel of the optical device of the present invention.

One of ordinary skill in the art will understand that depending upon the application of the optical device of the present invention, a different set of lenses that provide a predetermined level or range of magnification may be included within the optical device. For example, a power magnification of (2×–4×) provided by the objective lens may be used in an indoor stadium, while a higher power (4×–7×) provided by the objective lens may be used in an outdoor stadium. These suggested power levels are solely illustrative of the general distinction between power magnification levels used for indoor versus outdoor use and should not be construed to limit the invention.

Referring next to FIG. 4, a perspective view of gear assembly 50 in accordance with the invention may be generally appreciated. As shown, gear assembly 50 includes a support portion 54 and a frame 78. As shown, eye lens 48 is affixed to support portion 54 of gear assembly 50 and objective lens 49 is affixed to frame 78. Wheel 58 having teeth 64 along its circumference is joined at its center to wheel rod 62. Knob 68, representative of either knob 18 or 24 as shown in FIG. 1, is coupled to wheel rod 62. By turning knob 68, teeth 64 of wheel 58 mesh with tracks 74 of frame 78 thereby causing eye lens 48 to move toward or away from objective lens 40. Such movement adjusts the focus of the optical component.

Referring next to FIG. 5, a perspective view of gear assembly 50 after insertion of support portion 54 into frame 78 may be generally appreciated.

Referring next to FIG. 6, another exemplary but not limiting embodiment of the optical device of the present invention may be generally appreciated. As shown, optical device 100 includes a right barrel 204 and a left barrel 208. A clip 102 is used to clip the optical device 100 to brim 104 of cap 108. With clip 102, optical device 100 can be easily removed from and inserted onto cap 108.

Referring next to FIG. 7, optical device 100 of FIG. 6 may be better appreciated. More particularly, clip 102 is affixed to connecting band 202 that connects right barrel 204 to left barrel 208 of optical device 100. Each barrel includes a lens system of two or more lenses. A right focusing ring 214 for focusing right barrel viewing of optical device 100 is attached to either the rear or front of right barrel 204. Similarly, a left focusing ring 218 for focusing left barrel viewing of optical device 100 is attached to either the rear or front of lens barrel 208. As shown, hinge 224 connected between right and left barrels 204 and 208 allows the two barrels to be rotated in directions B–B' and C–C', respectively. Such rotation adjusts the spacing between the two barrels for adapting to the width of the user's eyes. In accordance with the present invention, the type of lenses included within the barrels of optical device 100 depend upon the particular use of optical device 100.

Although the clip of the optical device shown in FIG. 7 is clipped to the brim of a cap, alternative embodiments may include a clip to clip the optical device 100 to other headgear such as a visor.

Figure 8A:
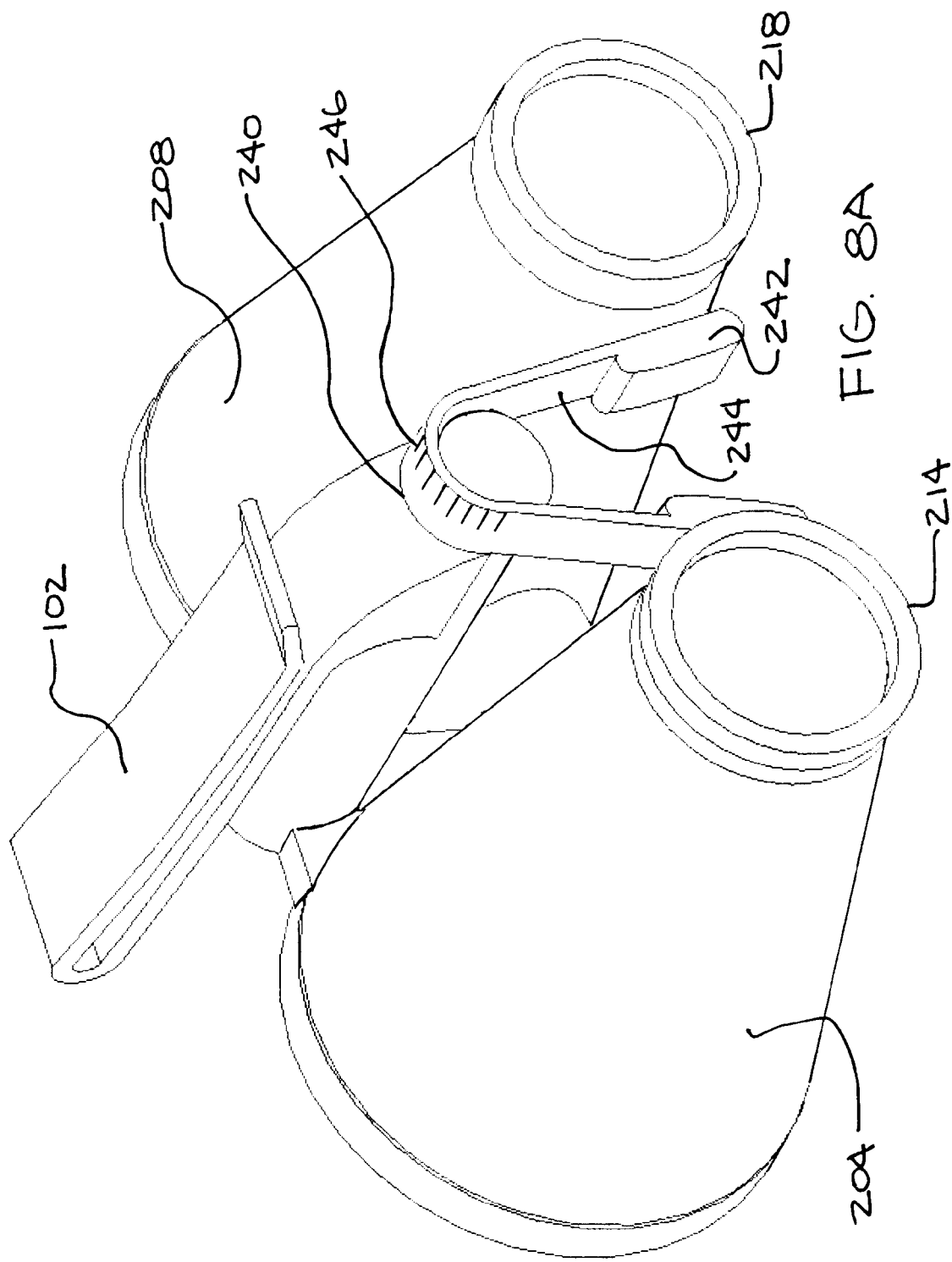
FIG. 8A shows a perspective view of the optical device shown in FIGS. 6 and 7 with an adjustable nose rest piece.

Referring next to FIG. 8A, optical device 100 of FIGS. 6 and 7 with an adjustable nose rest piece may be better appreciated. As shown, an adjustable nosepiece 240 is attached to the portion of the clip 102 facing the user. When in use, the adjustable nosepiece assists in stabilizing the position of the optical device with respect to the user. The adjustable nosepiece 240 include a pad 242 for each side of the nose and a bracket 240 therebetween. A knob 246 attached to the rear portion of the clip 102 adjust the adjustable nosepiece with respect to the user.

Referring next to FIG. 8B, the adjustable nosepiece 240 of FIG. 8A may be better appreciated. More particularly, FIG. 8B shows an exploded view of the adjustable nosepiece 240 of FIG. 8A. Although the nosepiece 240 is show with an optical device having a clip, the adjustable nosepiece 240 can be included in alternative embodiments of the present invention.

Figure 9A:
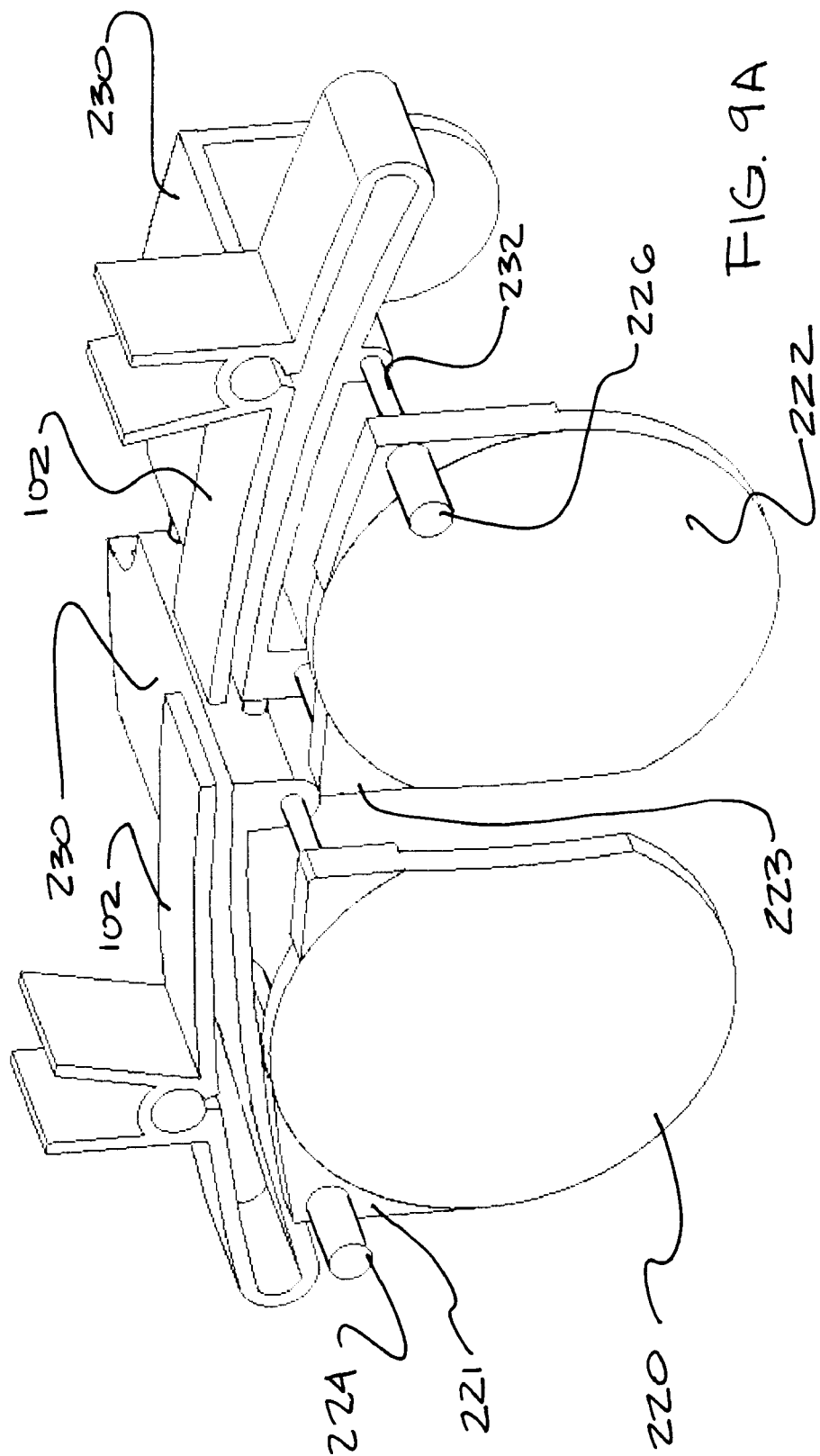
FIG. 9 shows another exemplary but not limiting embodiment of the optical device of the present invention.
Figure 9C:
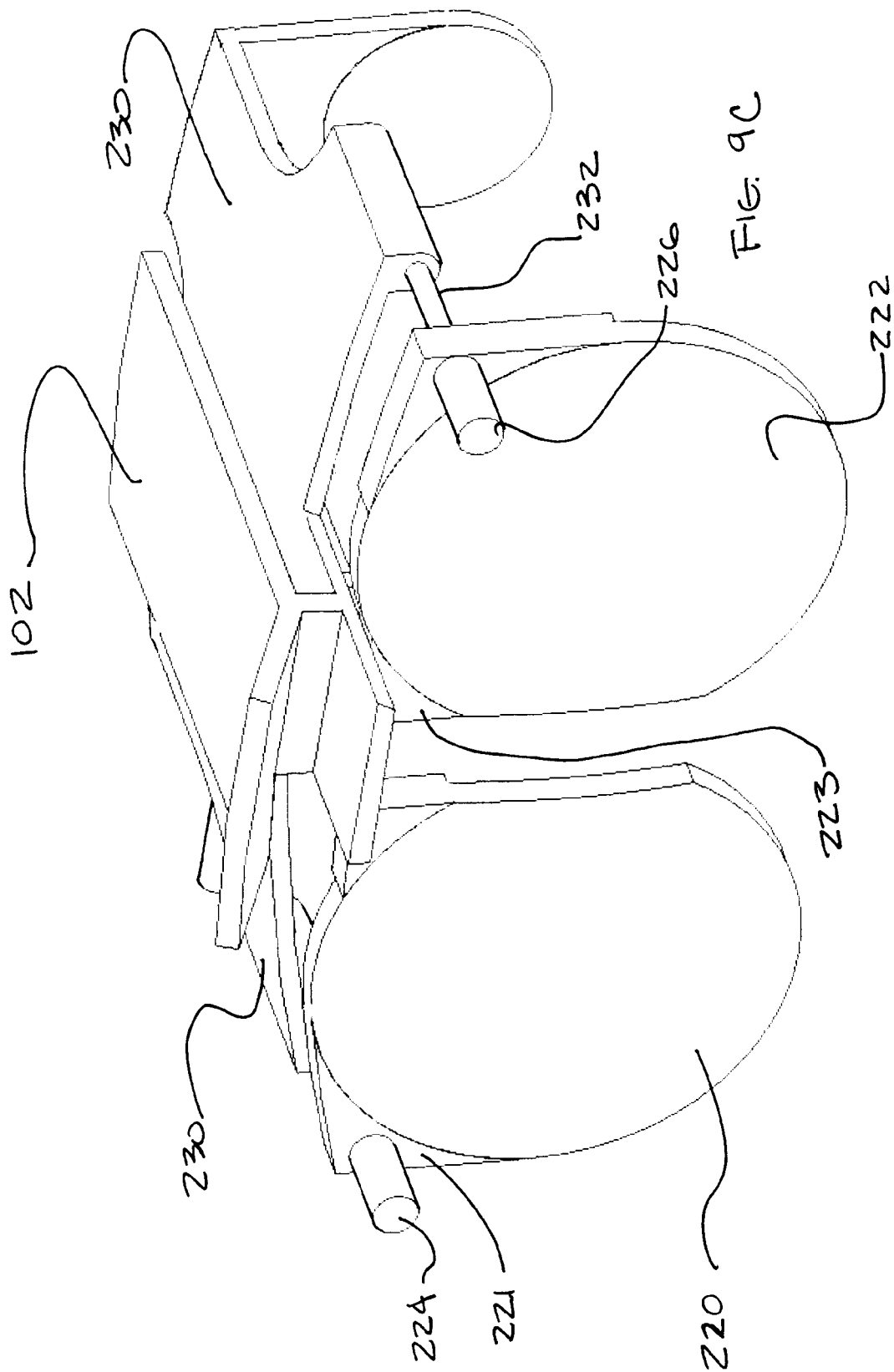

Referring next to FIG. 9, another exemplary but not limiting embodiment of the optical device of the present invention may be generally appreciated. As Shown, this embodiment does not includes barrels. Instead, objective lenses 222 and 220 are mounted directly onto a lens frames 221 and 223, respectively.

A right knob 224 and a left knob 226 mounted on a respective lens frame 224 and 226 adjust the focus of the right lens 222 and left lens 220 respectively.

Right knob 18 and left knob 24 are individually connected to a gear assembly (only screws 232 are shown). Center knob 2228 mounted between the right and left portions of the frame 230 when turned inwardly and outwardly moves the right and left lenses, thereby adjusting the space between each barrel. Adjusting space with the center knob 228 adapts the distance between the inwardly facing sides of the right and left lenses intraocular space between a user's eyes.

Although lens frames 221 and 223 are shown in the embodiment of FIG. 8, alternative embodiments of the present invention may not include a lens frame, so that the lens attached via the screws 232 of the gear assembly to the frame 230 of the optical device. Further, alternative embodiments may include lens sets that do not require focusing so that the user only needs to adjust for intraocular distance.

Figure 10:
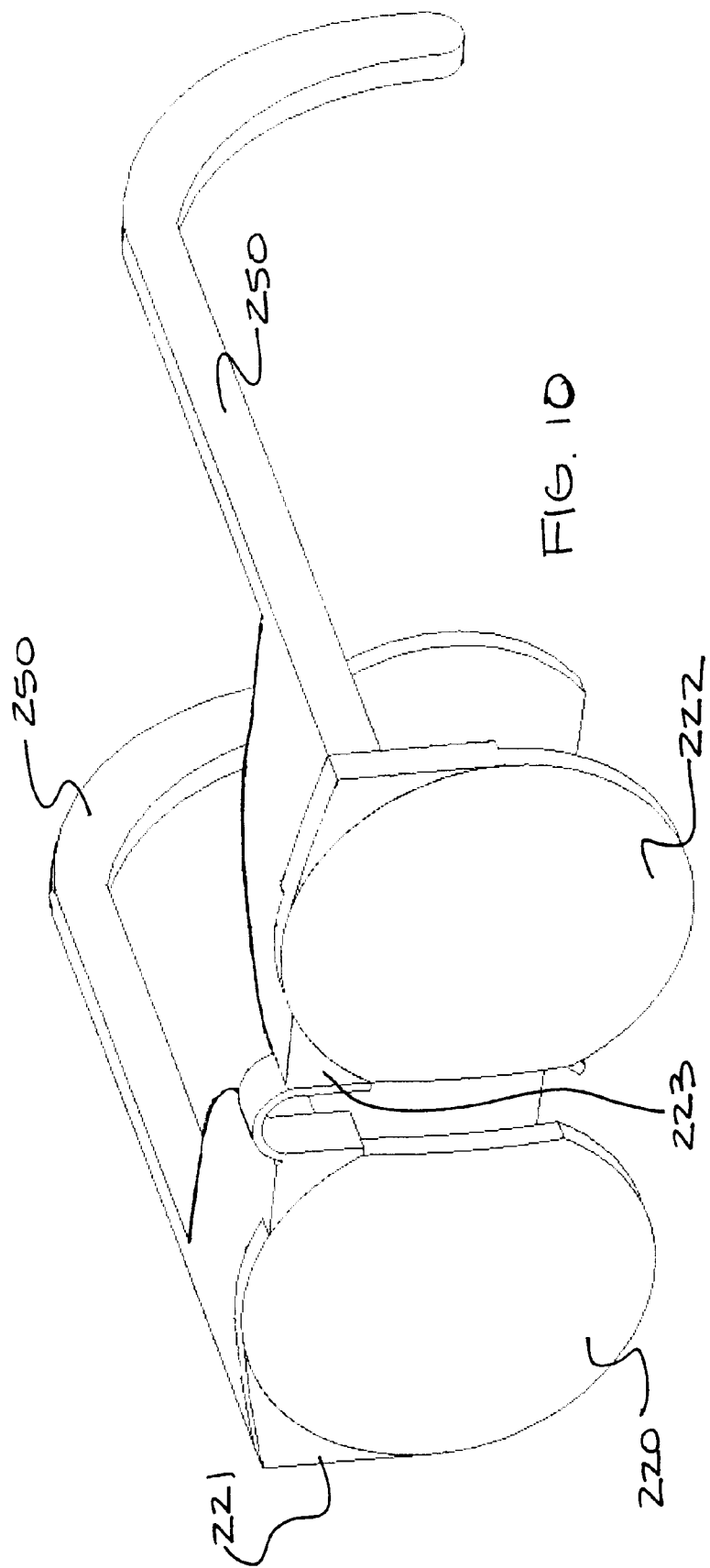
FIG. 10 shows an exemplary but not limiting embodiment of the present invention used for night vision.

Referring next of FIG. 10, an exemplary but not limiting embodiment of the present invention used of night vision may be generally appreciated. As shown, the optical component includes a left and right two lens set of night vision lenses (222 & 220). An example of night vision lenses is shown in Table 1. Each lens set is fixed within lens frame (223 & 221) respectively. The optical component is mounted to a frame 250, thereby allowing the user to wear the optical device as conventional eyeglasses. The night vision optical device will brighten and improve the clarity of the users view with a minor magnification added.

It can therefore be appreciated that a new and novel optical device has been described. It will be appreciated by those skilled in the art that, given the teaching herein, numerous alternatives and equivalents will be seen to exist which incorporate the invention disclosed hereby. As a result, the invention is not to be limited by the foregoing exemplary embodiments, but only by the following claims.

What is claimed is:

1. An optical device comprising:
   an optical component for magnifying an object;
   means for mounting the optical device to headgear, wherein the optical device is positioned to enlarge the user's view of the object and to follow the user's head movements; and
   wherein the magnification of the object by the optical component is sufficiently low that both near and far objects remain in focus.

2. The optical device as recited in claim 1, wherein the optical component comprises:
   a right and a left viewing sub-component each having a plurality of lenses adapted to provide a user's right and left eyes, respectively, a magnified view of the object.

3. The optical device as recited in claim 2, wherein the right and left viewing sub-components each include an objective lens and an eye lens.

4. The optical device as recited in claim 3, wherein the objective lens has a shape selected from a group consisting of positives meniscus, double-convex, and plano-convex.

5. The optical device as recited in claim 3, wherein the eye lens has a shape selected from a group consisting of plano-concave, double concave, and negative achromatic.

6. The optical device as recited in claim 3, wherein a sum of a focal length of the objective lens and a focal length of the eye lens corresponds to a magnification level provided by the optical component.

7. The optical device as recited in claim 3, wherein a combination of the objective lens having a large diameter and the eye lens having a large negative focal length provides the user a magnified view of a large viewing area.

8. The optical device as recited in claim 7, wherein the large diameter of the objective lens is sixty four mm. and the negative focal length of the eye lens is negative one hundred and seventy mm.

9. The optical device as recited in claim 3 further comprising a pair of gear assemblies, wherein one is coupled to the right viewing sub-component and the other is coupled to the left viewing sub-component, the gear assemblies move at least one of the plurality of lenses to adjust the focus of the optical component.

10. The optical device as recited in claim 9, wherein each gear assembly includes:
    a support portion to which the eye lens is attached to;
    a frame to which the objective lens is attached to, wherein the frame includes tracks;
    a wheel attached to the support portion and having teeth on its circumference,
    a knob; and
    a wheel rod coupled between the center of the wheel and the knob,
    wherein upon turning the knob the teeth of the wheel mesh with the tracks of the frame cause the support portion to move the eye lens in relation to the objective lens so as to adjust the focus of the optical component.

11. The optical device as recited in claim 3, wherein the headgear includes a brim, wherein the optical component is affixed to the brim.

12. The optical device as recited in claim 10, wherein
    the headgear includes a brim, and
    the knob of each gear assembly is disposed on the top of the brim.

13. The optical device as recited in claim 11, further comprising a knob disposed on the top of the brim that allows the user to adjust the spacing between the left and right viewing sub-component to adapt to the intraocular spacing between the user's eyes.

14. The optical device of claim 13 wherein the headgear is selected from a group consisting of a hat and a visor.

15. An optical device mounted to headgear, comprising:
    an optical component for magnifying an object;
    a clip attached to the optical component and clipped to the headgear, wherein the optical component is adapted for viewing by the user to enlarge the user's view of the object and to follow the user's headmovements; and
    wherein the magnification of the object by the optical component is sufficiently low that both near and far objects remain in focus.

16. The optical device of claim 15, wherein the optical component comprises:
    right and left viewing sub-components each having a plurality of lenses adapted to provide a user's right and left eyes, respectively, a magnified view of the object;
    a hinge coupled between the right and left viewing sub-component, wherein rotating the right and left viewing sub-component adjusts the space therebetween in relation to the user's intraocular spacing; and
    a focusing ring mounted to each of the right and left viewing sub-components for focus adjustment.

17. The optical device of claim 16, further comprising a connecting band coupled between the right and left viewing sub-components, wherein the clip is attached to the connecting band.

18. The optical device of claim 17, wherein the optical component comprises binoculars.

19. A method of providing a contiguous magnified view of an object for a user while the head of the user moves, the method comprising the steps of:
    providing an optical component for magnifying an object;
    providing a means for mounting the optical device to headgear, wherein the optical device is positioned to enlarge the user's view of the object and to follow the user's head movements; and
    wherein the magnification of the object by the optical component is sufficiently low that both near and far objects remain in focus.

20. The method as recited in claim 19, wherein the step of providing an optical component further comprises the steps of:
    providing a right and a left viewing sub-component each having a plurality of lenses adapted to provide a user's right and left eyes, respectively, a magnified view of the object; and
    providing a pair of gear assemblies, wherein one gear assembly is coupled to the right viewing sub-component and the other gear assembly is coupled to the left viewing sub-component, the gear assemblies moving at least one of the plurality of lenses to adjust the focus of the optical component.

21. The method as recited in claim 20, wherein the step of providing the right and the left viewing sub-component includes:
    providing a first polarity with a first magnification level; and
    providing a second polarity with a second magnification level.

22. An optical device comprising:

an optical component for magnifying an object, wherein the optical component is comprised of a right and a left viewing sub-component each having a plurality of lenses adapted to provide a magnified view of the object to a user's right and left eyes, respectively, and wherein the right and left viewing sub-components each include an objective lens and an eye lens;

means for mounting the optical device to headgear, wherein the optical device is positioned to enlarge the user's view of the object and to follow the user's head movements; and wherein a sum of a focal length of the objective lens and a focal length of the eye lens corresponds to a magnification level provided by the optical component.

23. An optical device comprising:

an optical component for magnifying an object, wherein the optical component is comprised of a right and a left viewing sub-component each having a plurality of lenses adapted to provide a magnified view of the object to a user's right and left eyes, respectively, and wherein the right and left viewing sub-components each include an objective lens and an eye lens;

means for mounting the optical device to headgear, wherein the optical device is positioned to enlarge the user's view of the object and to follow the user's head movements; and wherein a combination of the objective lens having a large diameter and the eye lens having a large negative focal length provides the user a magnified view of a large viewing area.

24. The optical device as recited in claim 23, wherein the large diameter of the objective lens is sixty four mm. and the negative focal length of the eye lens is negative one hundred and seventy mm.

25. An optical device comprising:

an optical component for magnifying an object, wherein the optical component is comprised of a right and a left viewing sub-component each having a plurality of lenses adapted to provide a magnified view of the object to a user's right and left eyes, respectively, and wherein the right and left viewing sub-components each include an objective lens and an eye lens;

means for mounting the optical device to headgear, wherein the optical device is positioned to enlarge the user's view of the object and to follow the user's head movements; and a pair of gear assemblies, wherein one is coupled to the right viewing sub-component and the other is coupled to the left viewing sub-component, the gear assemblies move at least one of the plurality of lenses to adjust the focus of the optical component;

wherein each gear assembly includes:
  a support portion to which the eye lens is attached to;
  a frame to which the objective lens is attached to, wherein the frame includes tracks;
  a wheel attached to the support portion and having teeth on its circumference,
  a knob; and
  a wheel rod coupled between the center of the wheel and the knob;

and wherein upon turning the knob the teeth of the wheel mesh with the tracks of the frame cause the support portion to move the eye lens in relation to the objective lens so as to adjust the focus of the optical component.

26. The optical device as recited in claim 25, wherein the headgear includes a brim, and the knob of each gear assembly is disposed on the top of the brim.

27. An optical device comprising:

an optical component for magnifying an object, wherein the optical component is comprised of a right and a left viewing sub-component each having a plurality of lenses adapted to provide a magnified view of the object to a user's right and left eyes, respectively, and wherein the right and left viewing sub-components each include an objective lens and an eye lens;

means for mounting the optical device to headgear, wherein the optical device is positioned to enlarge the user's view of the object and to follow the user's head movements;

wherein the headgear includes a brim and wherein the optical component is affixed to the brim; and a knob disposed on the top of the brim that allows the user to adjust the spacing between the left and right viewing sub-component to adapt to the intraocular spacing between the user's eyes.

28. The optical device as recited in claim 27, wherein the headgear is selected from a group consisting of a hat and a visor.

29. An optical device mounted to headgear, comprising:

an optical component for magnifying an object, wherein the optical component further comprises
  right and left viewing sub-components each having a plurality of lenses adapted to provide a magnified view of the object to a user's right and left eyes, respectively,
  a hinge coupled between the right and left viewing sub-component, wherein rotating the right and left viewing sub-component adjusts the space therebetween in relation to the user's intraocular spacing, and
  a focusing ring mounted to each of the right and left viewing sub-components for focus adjustment; and a clip attached to the optical component and clipped to the headgear, wherein the optical component is adapted for viewing by the user to enlarge the user's view of the object and to follow the user's headmovements.

30. The optical device as recited in claim 29, further comprising a connecting band coupled between the right and left viewing sub-components, wherein the clip is attached to the connecting band.

31. The optical device as recited in claim 30, wherein the optical component comprises binoculars.

32. The optical device as recited in claim 29, wherein the objective lens has a shape selected from a group consisting of positive meniscus, double-convex, and plano-convex.

33. The optical device as recited in claim 29, wherein the eye lens has a shape selected from a group consisting of plano-concave, double concave, and negative achromatic.

34. The optical device as recited in claim 29, wherein the headgear includes a brim, and the optical component is affixed to the brim.

* * * * *